United States Patent [19]

Ozawa et al.

[11] 3,810,245

[45] May 7, 1974

[54] SINGLE CRYSTAL FERRITE MAGNETIC HEAD

[75] Inventors: Kazunori Ozawa; Katsumasa Takahashi, both of Tokyo, Japan

[73] Assignee: Sony Corporation, Tokyo, Japan

[22] Filed: June 13, 1972

[21] Appl. No.: 262,343

[30] Foreign Application Priority Data

June 28, 1971 Japan .............................. 46-47071
June 28, 1971 Japan .............................. 46-47072

[52] U.S. Cl. ............................ 29/603, 360/127
[51] Int. Cl. ............................ G11b 5/22
[58] Field of Search......... 179/100.2 C; 346/74 MC; 340/174.1 F

[56] References Cited

UNITED STATES PATENTS

| | | | |
|---|---|---|---|
| 3,079,470 | 2/1963 | Camras | 179/100.2 C |
| 3,145,452 | 8/1964 | Camras | 179/100.2 C |
| 3,435,155 | 3/1969 | Van Der Voo | 179/100.2 C |
| 3,479,738 | 11/1969 | Hanak | 179/100.2 C X |
| 3,598,925 | 8/1971 | Yoshino Sakai | 179/100.2 C |
| 3,629,519 | 12/1971 | Hanak | 179/100.2 C |
| 3,674,944 | 7/1972 | Toshio Iemura et al. | 179/100.2 C |

*Primary Examiner*—Paul J. Henon
*Assistant Examiner*—Melvin B. Chapnick
*Attorney, Agent, or Firm*—Hill, Sherman, Meroni, Gross & Simpson

[57] ABSTRACT

A single crystal ferrite material magnetic head for a video tape recorder or other device which is formed with a pair of half-cores with an opening between them for winding and in which the magnetic gap by which the magnetic tape passes is formed of surfaces which are uniform and which have minimum breakage and roughness due to the fact that the planes on which the ferrite single crystal material is cut coincides with the orientation of the crystals of the material which gives the minimum breakage and cracking. Experimental tests have indicated that single crystal ferrite material may be cut or ground on certain planes with greater ease thus resulting in less breakage, fracture and cracking than on other planes, and, the present invention provides magnetic cores which are so formed that the transducing gap takes advantage of these discoveries and results in improved magnetic heads.

22 Claims, 31 Drawing Figures

SINGLE CRYSTAL FERRITE MAGNETIC HEAD

BACKGROUND OF THE INVENTION

1. Field of the Invention

This invention relates in general to magnetic heads and in particular to a single crystal ferrite magnetic head.

2. Description of the Prior Art

Prior art ferrite magnetic heads for video tape recorders, for example, have been formed so as to provide ferrite material with a wire winding opening therein and with a gap by which the magnetic tape passes. The surfaces defining the gap and those surfaces of the ferrite head contiguous to the gap have been subject to breakage, cracking and roughness which has resulted in non-uniformity of the magnetic reluctance across the gap and thus such magnetic heads of the prior art have not had uniform magnetic characteristics.

SUMMARY OF THE INVENTION

The present invention relates to a magnetic head for tape recorders or other devices comprising a pair of pole pieces wherein at least one of the pole pieces is formed of single crystal magnetic material which has a spinel-type crystallographic structure. Particularly at high frequency such as used for video, the problem has existed in obtaining a core configuration which has uniform frequency response characteristics. Part of the problem has resulted from roughness or breaks at the edges of the gap surface which defines the gap height dimension between the two core pieces of the head thus resulting in non-uniform frequency response.

The present invention provides an improved magnetic head of the single crystal ferrite type wherein the material is cut, machined or ground on surfaces adjacent to the gap wherein minimum breakage and fracturing occurs thus resulting in a magnetic head of much improved properties over those of the prior art. The inventors have discovered that single crystal ferrite material may be orientated relative to the magnetic core and the core gap and surfaces adjacent the gap such as those defining the wire winding opening so that minimum breakage and optimum results occur. The orientation of the crystalline structure of the material is defined and the particular angles upon which the material should be worked are specified so as to result in the improved magnetic head of the invention. The gap of the magnetic head is defined by intersecting planes such as the plane which lies in the gap, the plane against which the magnetic tape passes and the plane defining the surface of the wire winding opening adjacent the gap in the head. These are critical and by selecting these planes in accordance with the invention, the minimum roughness and breakage will occur thus resulting in a magnetic head of much improved characteristics.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figures 1, 4A, 4B, 5A, 5B, 6A, 6B, 7A, 7B:
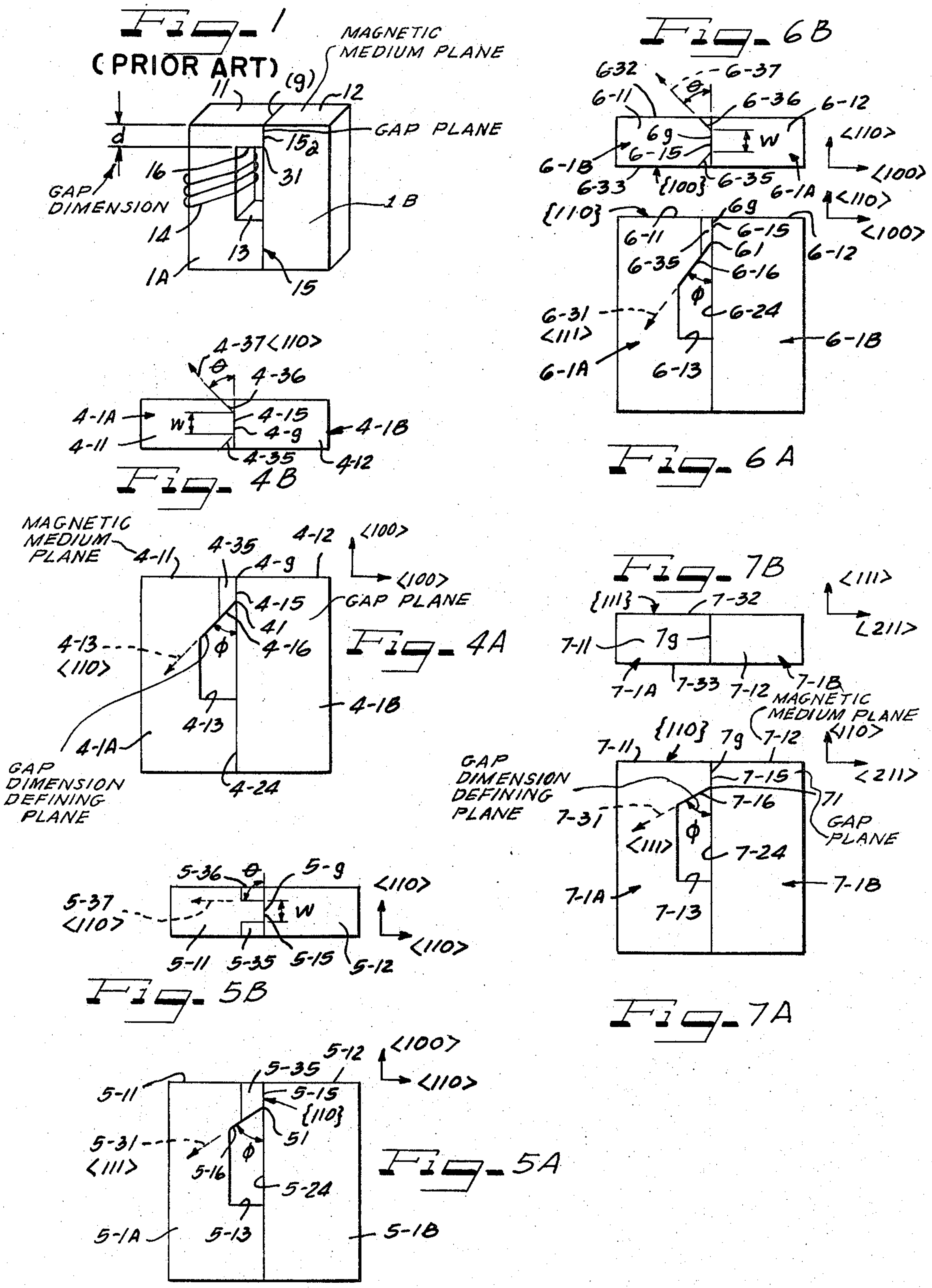
FIG. 1 (PRIOR ART), FIG. 4B, FIG. 4A, FIG. 5B, FIG. 5A, FIG. 6B, FIG. 6A, FIG. 7B, FIG. 7A
FIG. 1 is a diagrammatic perspective view of a prior art ferrite magnetic transducer head.
FIGS. 4A and 4B represent side and top views of the magnetic head according to this invention.
FIGS. 5A and 5B illustrate side and top views of a modified form of the improved head of this invention.
FIGS. 6A and 6B illustrate side and top views of a further modified head of the invention.
FIGS. 7A and 7B illustrate side and top views of further modified form of the magnetic head of the invention.

Referring to FIG. 1, there is illustrated a prior art ferrite magnetic head for a video tape recorder comprising a pair of half cores 1A and 1B disposed so as to define therebetween the transducing gap *g* disposed at the tape contacting surfaces 11 and 12.

In this type of magnetic head, at least one of the half cores such as 1A has a winding receiving aperture 13 for receiving a transducing winding receiving aperture such as 14. Winding 14 is formed in a side face of core 1A as shown in FIG. 1. The winding aperture 13 serves to define a depth dimension *d* of a gap *g*, said depth dimension in the illustrated head representing the distance between the plane of the tape contacting surface 11 and a surface 16 defining a top margin of the winding aperture 13.

Figure 2:
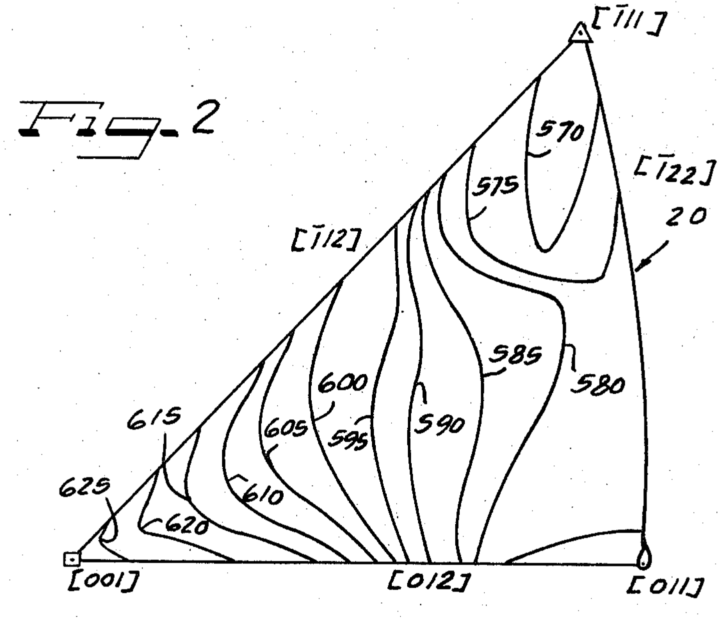
FIG. 2 is a plot of hardness measured on the Knoop scale as a function of observed axis of a single crystal ferrite material.

Experimental Results of FIGS. 2 and 3

While a prior art head such as shown in FIG. 1 is typically formed of sintered ferrite material, a single crystal ferrite is desirable for use in magnetic heads because of its high permeability in the high frequency range, its superior mechanical characteristics such as resistance to wear, and its dependability for long usage. Because of its hardness, however, single crystal ferrite material is more difficult to work than multiple crystal or sintered ferrite material, especially for very small size magnetic heads, such as those used in video tape recorders. Further the hardness results in a tendency of single crystal material to be very easily cracked at any weak point during processing of the material into a head.

This is true especially during the process of making the winding aperture 13 and if a crack is produced in the surface 16 adjoining the gap face indicated at 15*a* there will be an unevenness in the depth *d* of the gap *g* which will degradate the operation of the magnetic head.

The present invention makes it possible to produce a single crystal ferrite magnetic head which does not have such difficulties.

In the following description, the Miller indices will be used for defining the position and orientation of crystal planes and directions. Such nomenclature is well know to those skilled in the art and reference to Pages 33–35 of *Solid State Physics* by Charles Kittel and published by John Wiley & Sons (1956) may be made for more detailed definitions.

This invention is based on the findings that the hardness of single crystal ferrite material is not related to the crystal faces of the material but to the crystal axes, and that in particular the crystal axis directions <111> and <110> show the least hardness. This mechanical anisotropy of single crystal ferrite material allows the surface corresponding to surface 16 which adjoins the magnetic gap face and which determines the depth of the gap to be formed along the crystal axis <111> and/or <110>.

In particular FIG. 2 shows the relationship between each crystal axis of a single crystal ferrite material and its Knoop hardness based on actual measurement. FIG. 2 shows that the hardness is relatively low (less than 580) at the crystal axes lying at the right relative to FIG. 2 and indicated generally by reference numeral 20, and that in particular the hardness is low for surfaces lying along the crystal axes $[\bar{1}11]$ and [011].

As will be understood by those skilled in the art, the mechanical characteristics of $[\bar{1}11]$ and [011] are not limited to only these particular axes, since the same equivalent characteristics result with respect to axes [111], $[1\bar{1}1]$, $[11\bar{1}]$, $[\bar{1}11]$ . . . , and [110], [101], $[\bar{1}10]$ . . . , which are crystallographically equal and naturally of the same mechanical characteristics. As is understood by those skilled in the art, the set of axes equivalent to <111> is the general term for crystallographic orientation for [111], $[\bar{1}11]$, $[1\bar{1}1]$, . . . and crystal axis <110> is the general term for [110], [101], [011] . . . .

Figure 3B:
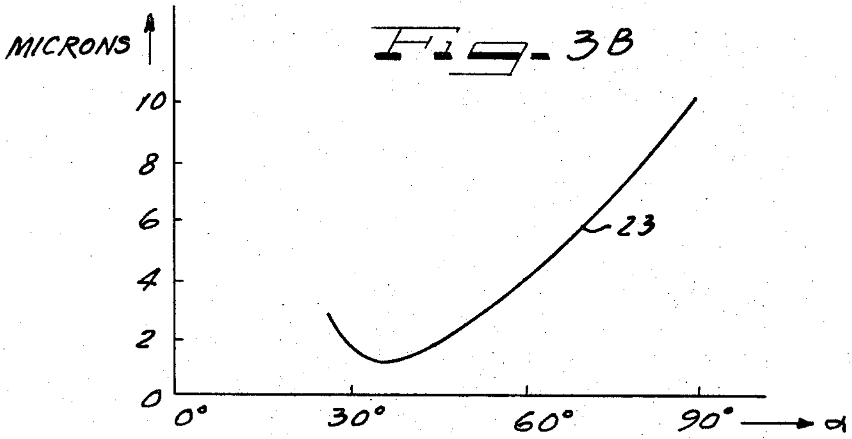
FIG. 3B is a plot of the ordinate values in millimicrons representing a measure of roughness against values of $\alpha$ plotted as abscissa which defines the angle of the inclined plane relative to FIG. 3A.
Figure 3C:
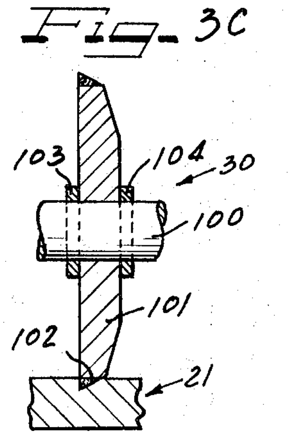
FIG. 3C is a sectional view of the cutter.
Figures 3A, 3D:
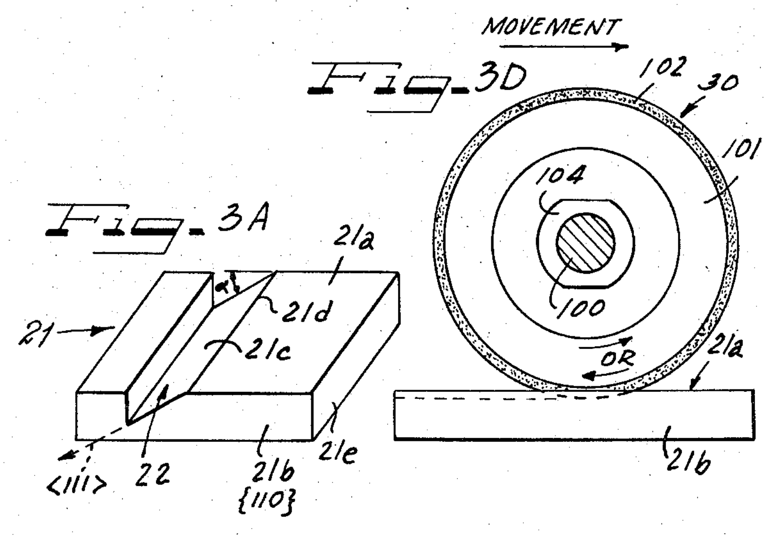
FIG. 3A is a perspective view illustrating a slab of a single crystal magnetic material showing a cut being made in the upper surface by a cutter.
FIG. 3D is a side view of the cutter.

As shown in FIG. 3A, if a single crystal ferrite material 21 has a first face 21*a* formed such that the face 21*a* corresponds to crystal face {100} and if side face 21*b* at right angle to face 21*a* corresponds to crystal face {110}, a ferrite core can be formed by cutting a notch 22 such as shown. Notch 22 has surface 21*c* which lies in crystal axis <111> or <110> formed at an angle $\alpha$ relative to the plane of surface 21*a*. Curve 23 of FIG. 3B is a plot of angle $\alpha$ as determined by measuring varying angle $\alpha$.

The surface 21*c* may be formed with a rotary diamond cutter 30 comprising a disk 101 mounted on shaft 100 by washers 103 and 104 all shown in FIG. 3C. The outer edge 102 is formed of diamond chips and is bevelled at an angle so as to be aligned to crystal axis <111> or <110>. For crystal axis <111> angle $\alpha$ is selected to be 35.3° so as to cut the surface 21*c* so that it lies in crystal axis <111>. Actual cutting is done from left to right relative to FIG. 3D.

FIG. 3B shows that chance of minimum breakage or roughness measured in microns of surface 21*c* occurs for an angle $\alpha$ of approximately 35.3°. This corresponds to the formation of the face 21*c* parallel to the crystal axis <111>. Thus, it has been experimentally determined that the minimum roughness for the common edge 21*d* is achieved where the face to be formed by grinding or the like lies parallel to the crystal axis <111>. It will be appreciated that in FIG. 3A, surface 21*a* is analogous to the surface of the gap 15*a* of the head configuration of FIG. 1, while the sloping or adjoining face 21*c* is analogous to the adjoining surface 16 of FIG. 1 which determines the gap depth dimension *d*. Thus, according to the results of FIG. 3B, the adjoining surface 21*c* which is to define the gap depth in conjunction with an opposite surface such as indicated at 21*e* should be formed so that an angle corresponding to the crystal axis <111> of about 35.3° exists.

Examples of practical embodiments of the present invention based on the foregoing experimental results are shown in FIGS. 4–14.

Embodiments of FIGS. 4–14

In FIGS. 4–14, parts which correspond to those of FIG. 1 are marked with the same reference numerals as in FIG. 1, but preceded by a numeral representing the figure number. The parts having corresponding reference numerals in the various figures have corresponding significance. Windings such as indicated at 14 are not shown in the various embodiments according to the present invention for the sake of simplicity.

The head illustrated in FIGS. 4A and 4B is constructed from single crystal ferrite material in such a way that the surface 4–15 defining the side of gap 4-*g* corresponds to the crystal face {100}. The corresponding face 4–24 of core part 4–1*b* may correspond to the same crystal face {100}. Also the tape engaging surfaces 4–11 and 4–12 may lie at the crystal face {100}.

At least one half core such as 4–1A has a winding aperture 4–13 formed in face 4–15. Especially in the present invention, adjoining wall face 4–16 which determines the gap depth *d* of gap 4–*g* is constructed so that it lies along the crystal axis <110> relative to the gap face 4–15.

As the axis <110> is at an angle $\theta$ of 45° to the gap defining face 4–15 (which is the crystal face {100}), the winding aperture 4–13 is formed with the adjoining surface 4–16 parallel to this crystal axis so that the angle $\phi$ in FIG. 4A is 45°.

A winding aperture such as 4–13 may be formed by means of a cutter-like disc type rotary grindstone or cutter with multiblade with grinding sand or other suitable particles attached thereto, or a diamond cutter, such as generally indicated at 30 in FIG. 3C. Alternatively, the same type of sloping cutting face may be provided by cutting by sandblasting the surface 4–16.

FIG. 4A shows that surface 4–16 adjoining gap face 4–15 is formed parallel to axis <110> as represented by the dashed line arrow 4–31.

The structure of FIG. 5A is formed from a single crystal ferrite with the faces facing the magnetic medium numbered 5–11 and 5–12 and those faces which the magnetic tape moves past are crystal face {100} as indicated by the arrows in the upper right hand corner relative to FIG. 5A. The surfaces 5–15 are crystal face {110}. Crystal axis <111> is at the angle $\phi$ of 54.7° between surfaces 5–15 and 5–16 as shown. The wire aperture 5–13 is formed such that the surface 5–16 lies along the axis <111>.

FIG. 6A is constructed of single crystal ferrite wherein the faces 6–11 and 6–12 facing the magnetic medium of the core halves 6–1A and 6–1B lie parallel to crystal face {110}, while side faces 6–32 and 6–33 adjacent surface 6–11 and gap face 6–15 are crystal face {110}. In this case, adjoining surface 6–16 is formed parallel to axis <111> so that the angle $\phi$ in FIG. 6A has a value of 35.3° which corresponds to the angle referred to in FIG. 3A. This angle is between the plane of the adjoining surface 6–16 and the plane of the gap face 6–15, the latter lying parallel to crystal face {110}. Thus, the winding aperture 6–13 is so formed that surface 6–16 thereof extends parallel to the direction of axis <111> as represented by arrow 6–31.

The head of FIG. 7 is also made from single crystal ferrite material with the tape confronting surfaces 7–11 and 7–12 of cores 7–1A and 7–1B lying in crystal face {110}. The side faces 7–32 and 7–33 is of crystal face {111}. In this case, adjoining surface 7–16 of winding aperture 7–13 is formed substantially at an angle $\theta$ of 60° to gap face 7–15 (which lies parallel to crystal face {211}). Thus, the winding aperture 7–13 is so formed that adjoining surface 7–16 extends substantially along the crystallographic axis 111 as represented by dashed line arrow 7–31 in FIG. 7A.

Thus, in each of the embodiments of FIGS. 4–7, according to the present invention, the adjoining surface corresponding to surface 16 of FIG. 1 which determines the depth $d$ of the transducing gap $g$ is formed so as to lie in a plane substantially parallel to the crystal axis <111> or <110>. As a result of this cofiguration relative to the plane of the gap face indicated as 15 in FIG. 1, the common edge such as indicated at 31 in FIG. 1, 41 in FIG. 4A, 51 in FIG. 5A, 61 in FIG. 6A and 71 in FIG. 7A, can be formed with minimum breakage and roughness as explained in reference to FIG. 3A. Thus, with the adjoining surface such as 16 formed according to the present invention and correlated with the crystallographic plane of the gap face, the common edge such as 21 has maximum smoothness so as to provide a gap height of substantially maximum uniformity. It is theorized that this is achieved by forming the adjoining surface such as indicated at 16 at such an angle as to be parallel to a crystallographic axis lying substantially in the range of axes as represented at 20 in FIG. 2 or equivalent crystallographic axes, that is, axes lying substantially in the ranges of axes extending from <111> through <122>, to <011>. Most preferably, the single crystal ferrite material is formed with a composition on a mol per cent basis of approximately 50 mol per cent $Fe_2O_3$, 30–40 mol per cent MnO, and approximately 10–20 mol percent ZnO. By forming the adjoining surface at angles such as those explained herein, the winding aperture such as 13 will be formed in a predetermined manner while avoiding detrimental cracks at the common edge such as 21 so as to insure a higher yield and uniform specifications for the magnetic head.

The embodiments of FIGS. 4–6 further illustrate the provision of recesses such as 4–35, 4–36, 5–35, 5–36, 6–35 and 6–36 in the side surfaces of the core part corresponding to 1A in FIG. 1 such that the scanning width W of the head is less than the maximum width of the confronting surfaces corresponding to 12. While two recesses are illustrated, it will be understood that a single recess could be formed in only one side surface. In accordance with the present invention, these recesses are so formed that the angularly disposed face defining the recess or each recess is along the crystal axis <111> or <110> as represented by the dashed line arrows such as 4–37, 5–37 and 6–37.

Thus, in the case of FIG. 4B, the recesses are so cut that the faces of the recesses 4–35 and 4–36 defining the width of gap face 4–15 are at an angle $\theta$ of 45° to the plane of the gap **4–*g*, and are parallel to the axis <110>. The distance between the recesses 4–35 and 4–36 at gap 4–*g*** represents the desired scanning width W of the magnetic head as represented in FIG. 4B.

In the case of FIG. 5B, the angularly disposed surfaces defining recesses 5–35 and 5–36 which adjoin gap face 5–15 and define the width of gap 5–g are disposed at an angle $\theta$ of 90° to the gap face.

In the case of FIG. 6B, the scanning width W defining surfaces of recesses 6–35 and 6–36 are cut along directions parallel to the axis <111> which is at an angle $\theta$ of 60° to gap face 6–15 for the crystallographic orientations as represented by the solid line shown by the arrows at the right of FIG. 6A and FIG. 6B.

Method of FIG. 8

FIG. 8 illustrates the successive steps in forming magnetic heads such as illustrated in FIGS. 4–7 where the joining surfaces corresponding to surface 16 are to be disposed at an angle indicated by $\phi$ in these views.

Figures 8A, 8B, 8C, 8D, 9A, 9B, 9C:
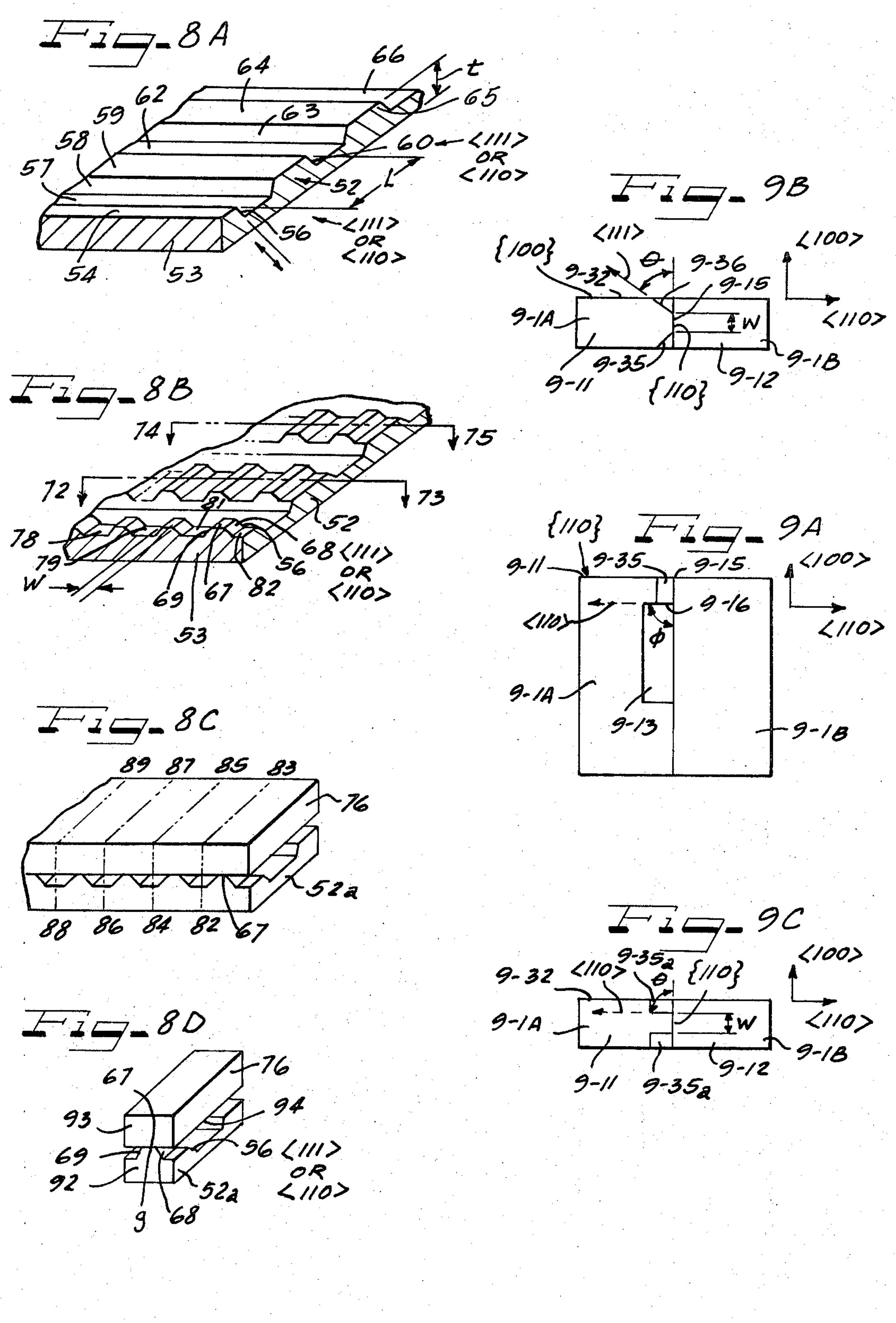
FIGS. 8A, 8B, 8C and 8D illustrate steps in the method of forming improved magnetic heads according to the invention.
FIGS. 9A and 9B are side and top views of a modified form of the invention.
FIG. 9C is a top view of a further modified form of the invention.

FIG. 8A illustrates a sheet of magnetic material 52 which might be single crystal ferrite about 1 millimeter in thickness which is sliced and polished. Grooves 57, 62 and 66 are cut parallel to each other in the ferrite material 52. The grooves are spaced apart about 2 millimeters as indicated by the dimension L. The grooves 57, 62 and 66 may be cut by suitable cutting tools or by sandblasting. One side surface of each of the grooves is designated as 56 in groove 57, 60 in groove 62 and 65 in groove 66, is aligned to be along the direction of the axes <111> or <110> and these surfaces correspond to the surface 4–16 in FIG. 4A. The opposite sides of the grooves 58 and 63 respectively correspond to the side 4–13 in FIG. 4A, for example.

Then, as shown in FIG. 8B, parallel grooves are cut at right angles to the grooves 57, 62 and 66 and are designated 78, 79, 81 and 82, respectively. The sides of these grooves are tapered as shown so as to provide gaps having the width W as shown. The sides of the pole pieces thus formed are chosen so that they lie along the direction of the axes <111> or <110> to correspond to the angle $\phi$ in FIG. 4B for example. These surfaces are indicated by numerals 68 and 69 in FIG. 8B.

The sheet of ferrite material 52 is then cut on lines 72–73 and 74–75 to form a plurality of side by side core halves.

Another sheet of ferrite material 76 is attached to the portion **52*a* of sheet 52 as shown in FIG. 8C. Sheet 76 may be attached by suitable glue or other bonding material and a spacer 67 as for example of glass or copper leaf is provided in the gap between the sheets 52***a* and 76. Then individual magnetic heads are formed by cutting on lines 82–83, 84–85, 86–87 and 88–89 to form a plurality of individual magnetic heads such as illustrated in FIG. 8D. It will be observed that the structure of FIG. 8D comprises an individual magnetic head such as shown in FIGS. 4A and 4B, for example. The core half 76, for example, corresponds to the core half 4–1*b* of FIG. 4A, and the core portion 52*a* corresponds to the core half 4–1*a* of FIG. 4A. The magnetic gap *g* is formed between the core portions. Then the surfaces 92 and 93 against which the magnetic medium will move are polished and wire is wound in the opening 94 between the core portions 52*a* and 76. The surfaces 68, 69 and 56 are formed at the crystallographic angles as defined in this specification. It is to be realized, of course, that although the angles have been specified precisely in the specification, that in actual embodiments and under actual production conditions, the angle of the surfaces 56, 68 and 69 may vary by as much as plus or minus 5° or 10° without departing from the advantages and teachings of this invention.

FIGS. 9–14 illustrate variations of the invention wherein the openings corresponding to the opening 13 in FIG. 1 of the embodiments are generally rectangular shaped, or at least the upper surface corresponding to the surface 16, is parallel to the tape engaging surface corresponding to the surface 11 in FIG. 1. However, in all of these embodiments in which the angle $\phi$ is equal to 90° as indicated by the arrow lying in the plane of the surface 16 in each figure, the orientation of the single crystal ferrite in the core half corresponding to core half 1A of FIG. 1 is aligned as indicated in the drawing so as to provide a gap with minimum breakage thus resulting in a substantially improved structure. This is due to orientation of the crystal axes so as to obtain minimum breakage.

For example, in the embodiment illustrated in FIGS. 9A and 9B, the core portion 9–1*a* is formed such that the surface 9–11 lies in the plane {110}. The bottom surface of the gap relative to FIG. 9A indicated 9-16 lies in the direction <110>. The surface of the gap 9–15 lies in the surface {110}. The surface 9–32 lies in the surface {100}. The surface 9–36 determined by the angle $\theta$ extends in the direction <111>.

The top view of FIG. 9C differs from the structure of FIG. 9B in that the sides of the gap are cut out such that the angle $\theta$ is 90° so as to form the side surfaces 9–36*a* and 9–35*a*. The other alignments of the crystal in FIG. 9C are similar to those in FIG. 9B.

Figures 10A, 10B, 11A, 11B, 12A, 12B, 13A, 13B, 14A, 14B:
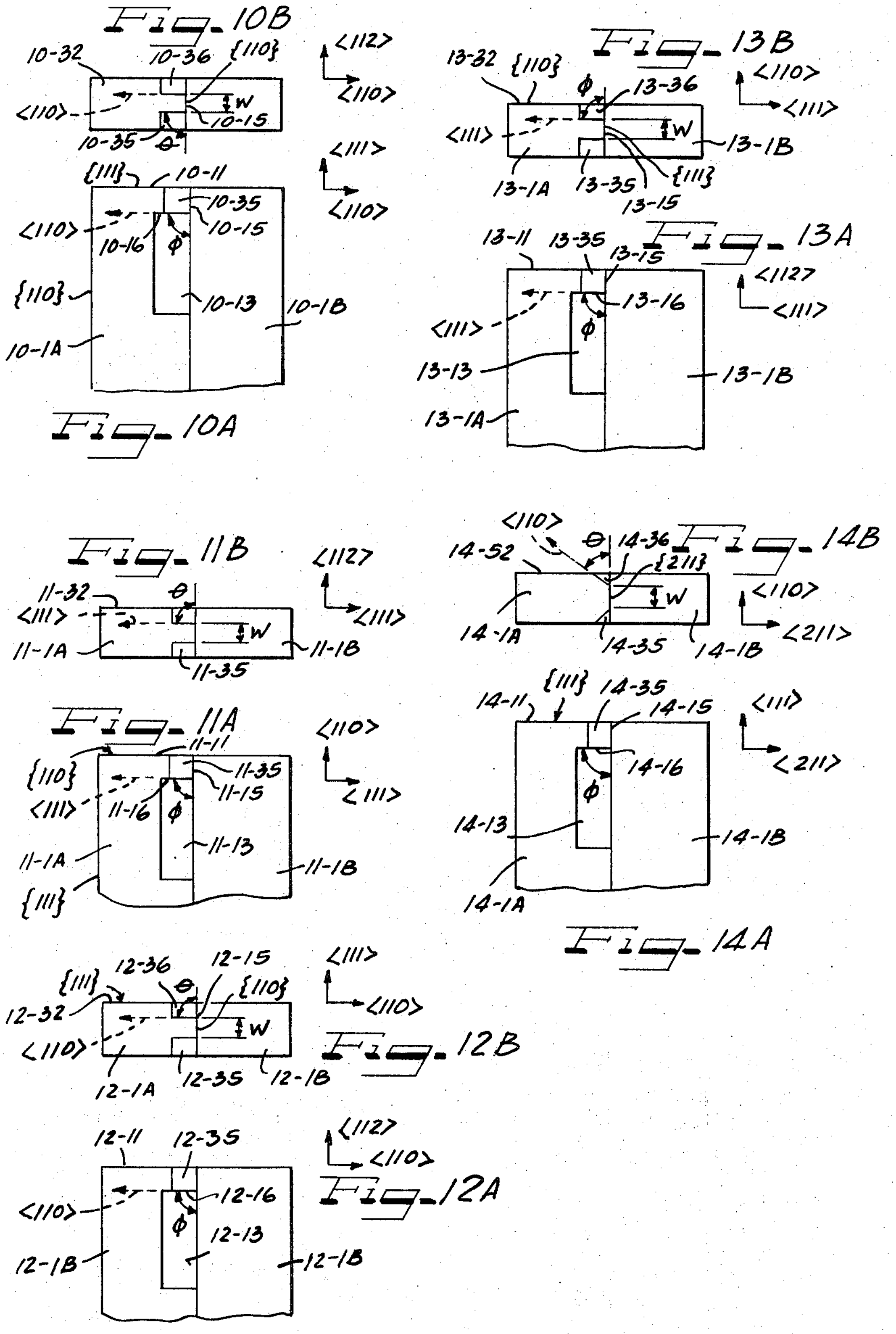
FIGS. 10A and 10B are side and top views respectively of a modified form of the invention.
FIGS. 11A and 11B are side and top views of a further modified form of the invention.
FIGS. 12A and 12B are respectively side and top views of a further modified form of the invention.
FIGS. 13A and 13B illustrate respectively side and top views of a further modified form of the invention.
FIGS. 14A and 14B illustrate the side and top views of a still further modified form of the invention.

FIG. 10 illustrates an embodiment wherein the surface 10–16 lies in the direction <110> and the surface 10–11 lies in the plane {111}. The surface adjacent the left edge relative to FIG. 10 lies in the plane {110} and the gap 10–15 also lies in the plane {110}. The direction of alignment of the axes for all the figures is indicated to the right of the figure and is as indicated.

In FIG. 11 the surface 11–11 lies in the plane {110} and the surface 11–16 lies in a direction <111> indicated by the arrow. The directions of alignment of other surfaces are indicated by the arrows at the right of the figure.

FIG. 12 illustrates an embodiment where the surface 12–32 lies in the plane {111} and the side wall of the surface 12–36 lies in the direction <110> as shown by the arrow. The gap 12–15 lies in the surface {110}. The directions of alignment are indicated by the arrows at the right of the figure.

In FIG. 13 the surface 13–32 lies in the surface {110} and the gap 13–15 lies in the surface {111} and the arrow which lies in the surface 13–36 extends in the direction <111>. The arrows at the right illustrate the orientation.

In FIG. 14 the surface 14–36 extends in the direction of <110> and the surface 14–11 lies in the plane {111}. The gap 14–15 lies in the plane {211}. The orientation is illustrated by the arrows at the right.

Each of the structures of the embodiments illustrated in FIGS. 9–14 have surfaces 16 which are parallel to the surfaces 11. The alignment of the single crystal ferrite material relative to the various surfaces allows the various configurations to be formed with a minimum of breakage and cracking of the core halves.

Actual production models have been constructed which have the configuration of FIG. 7B as far as the physical shape but which have the orientation of crystal indicated in FIG. 6A. In such production heads the gap has a height of 65 microns and the gap has a width (track) of 85 microns.

The invention is based on the discovery that the Knoop hardness of a ferrite single crystal depends not upon a crystallographical plane but on a crystallographical axis along which the longer diagonal line of the diamond-shaped Knoop wedge is aligned.

FIG. 2 is a stereographic projection chart in which each point represents a crystal axis and its equivalent axes. This chart is well known in the field of crystallography. The Knoop hardness depends only upon the crystal axis. While one specific axis is contained in several different crystal planes, the Knoop hardness may be constant so far as the longer diagonal of the diamond wedge is aligned along the specific axis.

It is seen that this invention provides an improved single crystal ferrite head which may be formed so as to provide improved results and wherein the orientation of the various planes and axes of crystals are selected to obtain the improved results.

Although minor modifications might be suggested by those versed in the art, it should be understood that we wish to embody within the scope of the patent warranted hereon all such modifications as reasonably and properly come within the scope of our contribution to the art.

We claim as our invention:

1. A magnetic head for a magnetic medium formed of a pair of half core members formed of single crystal material of spinel type, said half core members having a first flat planar surface against which said magnetic medium travels, said half core members meeting to form a gap which lies in a second plane substantially at right angles to said first flat planar surface, a wire winding opening formed between said half core members in at least one of said half core members such that a third planar surface is formed on said one half core member and extends generally in the same direction as said first planar surface to said gap thus defining a gap dimension transverse to the plane of said first planar surface, and said third planar surface is parallel to a crystallographic axis of said one half core member lying substantially in the ranges of axes extending from <111> through <122> to <011>.

2. A magnetic head according to claim 1 wherein said single crystal material is a ferrite with a composition in mol percent of approximately $Fe_2O_3$ — 50, MnO — 30–40 and ZnO — 10–20.

3. A pole piece of single crystal material of spinel type for a magnetic head with a wire winding opening and having a first planar surface crystal face defining a gap plane, a second planar surface forming angle $\phi$ with said first planar surface and defining one side of said wire winding opening, and a third planar surface defining a magnetic engaging surface and forming an angle of ninety degrees with said first planar surface and an edge formed where said first and second planar surfaces meet, and said angle $\phi$ being such that said second planar surface is parallel to a crystallographic axis of said magnetic head lying in the range of axis extending from <111> through <122> to <011>.

4. A pole piece according to claim 3 wherein said second planar surface is parallel to the crystal axis <110> of said magnetic head.

5. A pole piece according to claim 4 wherein said first planar surface is crystal face {100} and said angle $\phi$ is about 45°.

6. A pole piece according to claim 5 wherein at least one side of said pole piece adjoining said gap plane is truncated to form a fourth planar surface which is parallel to the crystal axis <110> of said magnetic head.

7. A pole piece according to claim 4 wherein said first planar surface is crystal face {110} of said magnetic head.

8. A pole piece according to claim 7 wherein a notch is formed in at least one side of said pole piece to define a fourth planar surface which is parallel to crystal axis <110> of said magnetic head.

9. A pole piece according to claim 7 wherein at least one side of said pole piece adjoining said gap plane is truncated to form a fourth surface which is parallel to crystal axis <111> of said magnetic head.

10. A pole piece according to claim 4 wherein said first planar surface of said magnetic head is crystal face {110} and said third planar surface of said magnetic head is crystal face {111}.

11. A pole piece according to claim 4 wherein said first planar surface of said magnetic head is crystal face {110} and a fourth planar surface of said magnetic head defines a side surface which is crystal face {111}.

12. A pole piece according to claim 3 wherein said angle $\phi$ is in the range 30°–40°.

13. A pole piece according to claim 3 wherein said angle $\phi$ is in the range of 33°–37°.

14. A pole piece of single crystal material of spinal type according to claim 3 wherein said second planar surface is parallel to the crystal axis <111> of said magnetic head.

15. A pole piece according to claim 14 wherein said first plane is crystal face {110} of said magnetic head.

16. A pole piece according to claim 14 wherein said first planar surface is crystal face {211} of said magnetic head.

17. A pole piece according to claim 16 wherein said third planar surface is crystal face {110} of said magnetic head.

18. A pole piece according to claim 14 wherein said third planar surface is crystal face {110} of said magnetic head.

19. A pole piece according to claim 14 wherein said first planar surface is crystal face {111} of said magnetic head.

20. A pole piece according to claim 3 wherein said second planar surface of said magnetic head is parallel to the crystal axis <211>.

21. A pole piece according to claim 20 wherein said first planar surface of said magnetic head is crystal face {211}.

22. A pole piece according to claim 21 wherein said third planar surface of said magnetic head is crystal face {111}.

* * * * *